United States Patent Office 3,155,612
Patented Nov. 3, 1964

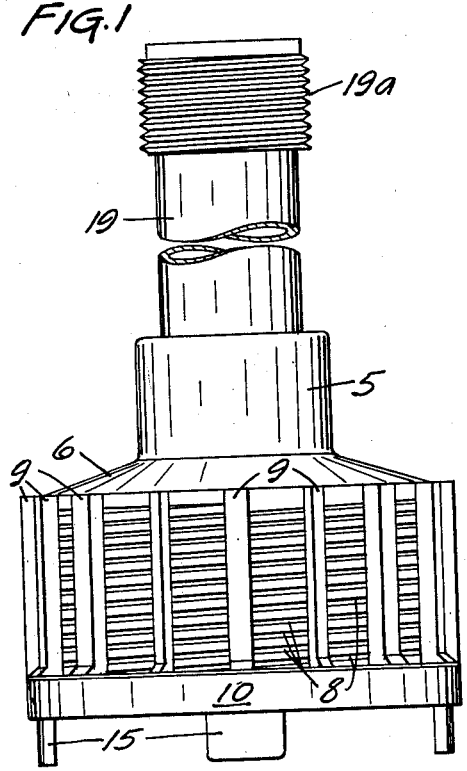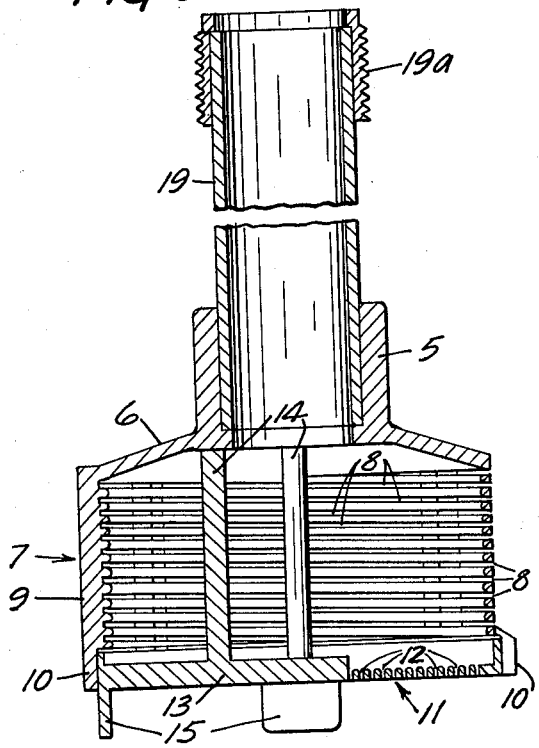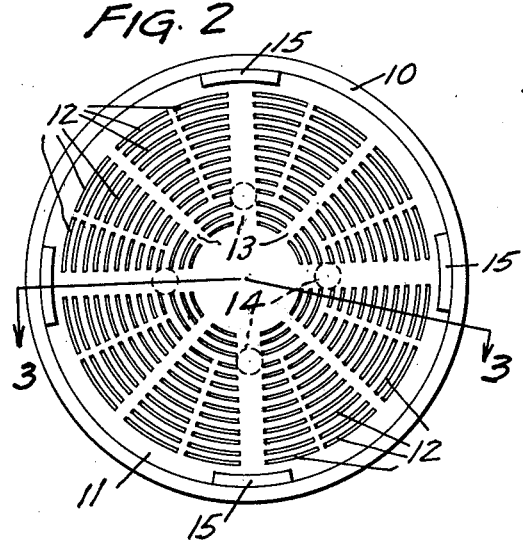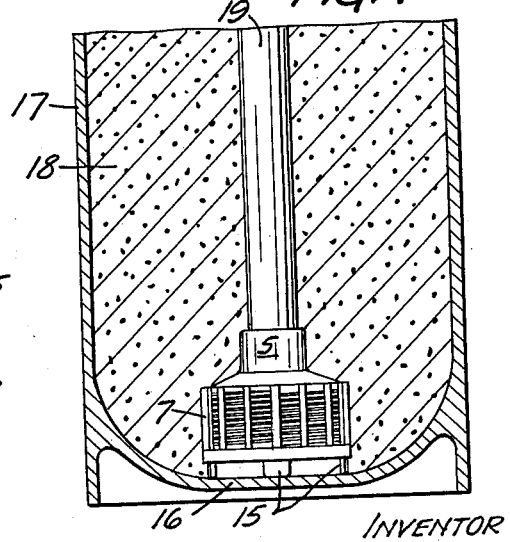
INVENTOR
ARNOLD J. WEBER
BY John E. Thrysher
ATTORNEY

3,155,612
FLUID DISTRIBUTOR FOR TANKS
Arnold J. Weber, White Bear Lake, Minn., assignor to Union Tank Car Company, Chicago, Ill., a corporation of New Jersey
Filed May 2, 1962, Ser. No. 191,766
6 Claims. (Cl. 210—291)

This invention relates to improvements in fluid distributors for tanks and particularly for distributing fluid in the lower portion of a tank containing fine particulate material such as water softening ion exchange resins or other particulate filter or water treatment granules.

It is an object of my invention to provide a distributor of the class described which is operative to effect high rate, more uniform distribution of effluent both horizontally and downwardly in a bed of particulate material.

A further object is to provide a distributor of the class described having a multiplicity of attenuated flow slots adapted to exclude fine particulate material from the interior of the distributor and at the same time provide a high rate of flow both out from and into an interior chamber of the distributor.

Another object is to provide a low cost, unitary distributor adapted to be molded from a suitable synthetic resin or plastic material.

The invention also includes certain other novel features of construction which will be more fully pointed out in the following specification and claims.

Referring to the accompanying drawing which illustrates the preferred embodiment of my invention, by way of example:

FIGURE 1 is a side elevational view of the distributor;
FIG. 2 is a bottom plan view of the same;
FIG. 3 is a vertical sectional view taken on the line 3—3 of FIG. 2; and
FIG. 4 illustrates a typical arrangement of my improved distributor in the lower portion of a tank containing particulate material, the tank being shown in vertical section.

As shown in the drawing, a main body portion of the distributor comprises a tubular hub member 5, an annular flange 6 extending substantially radially outwardly from the normally lower end of the hub member 5 and a tubular wall of relatively large diameter, indicated generally by the numeral 7. This wall is formed with a multiplicity of attenuated, elongated, arcuate slots 8 interrupted at intervals by substantially parallel ribs 9 connecting the outer periphery of the flange 6 to an imperforate skirt portion 10 of the wall 7. The members 5, 6, 7, 9 and 10 are molded as a unit in a mold having a core formed by a thread-like spiral projection fitting against a cavity member which is recessed to form the ribs 9 and other outer surfaces of the wall 7.

A generally circular end wall 11 fits within the skirt portion 10 and is solvent welded or otherwise secured to the wall 7. A multiplicity of concentric arcuate slots 12 are formed in the wall 11 for the passage of fluid to and from the interior chamber of the distributor. Reinforcing radial ribs 13 are provided at intervals around the bottom wall 11 and, as shown in FIG. 3, project upwardly from the slotted areas of the end wall. Projecting upwardly from some of the ribs 13 in spaced relation to the wall 7 is a brace rod 14, the upper end of which engages the inner, lower surface of the hub member 5 so that the wall 11 is reinforced and supported in predetermined spaced relation to the hub 5 and flange 6. A series of circumferentially spaced feet 15 project downwardly from the outer periphery of the end wall 11 to insure the spacing of the distributor above the bottom of a tank or other container in which the distributor is mounted.

As shown in FIG. 4, my improved distributor may be positioned adjacent to a bottom wall 16 of a tank 17 containing particulate material 18 through which a liquid is to be filtered. Flow to and from the interior of the distributor is through a conduit 19 rigidly connected to the hub 5, as shown in FIGS. 1 and 3 and provided, as shown, with a threaded upper end 19a for connecting the distributor assembly to a valve port or other flow control. Ordinarily the tank 17 is of generally cylindrical shape and the distributor is suspended within the tank in substantially coaxial position therein. Flow from the interior of the distributor is thus directed radially outward in all directions through the slots 8 and maximum flow through all cross sectional areas of the material 18 is insured by the downward flow through the arcuate slots 12 in the bottom wall 11. For maximum efficiency in excluding particulate material from the interior of the distributor and to minimize the lodging of solid particles in the slots 8 and 12, the surfaces defining these slots converge outwardly so that the maximum restriction is at the outer faces of the walls 7 and 11.

I claim:

1. A distributor for a liquid treatment tank comprising, a unitary body member having a tubular hub portion, an annular flange projecting substantially radially outward from said hub portion, a generally tubular wall depending from the outer periphery of said flange, formed with a multiplicity of attenuated slots, and a disk-like end wall secured to the outer periphery of said tubular wall in downwardly spaced relation to said flange, said end wall being formed with a multiplicity of arcuate concentric attenuated slots for the passage of fluid to and from an internal chamber defined by said flange, tubular wall and end wall members, said arcuate slots in said end wall being interrupted by a plurality of radially extending ribs, and a plurality of circumferentially spaced feet projecting downwardly from said end wall for spacing said distributor upwardly from the bottom of said tank.

2. A distributor in accordance with claim 1 including a plurality of brace rods projecting upwardly from said radially extending ribs to said annular flange in radially inwardly spaced relation to said tubular wall.

3. A distributor in accordance with claim 1 wherein said generally tubular wall is formed with an annular imperforate skirt portion around its lower margin to which said end wall is secured.

4. A distributor for a liquid treatment tank comprising, a unitary body of molded synthetic resin material having a tubular hub portion, an annular flange projecting substantially radially outward from said hub portion, a generally tubular wall depending from the outer periphery of said flange, formed with a multiplicity of attenuated slots, and a disk-like end wall secured to the outer periphery of said tubular wall in downwardly spaced relation to said flange, said end wall being formed with a multiplicity of arcuate concentric attenuated slots for the passage of fluid to and from an internal chamber defined by said flange, tubular wall and end wall members, and a plurality of circumferentially spaced feet projecting downwardly from said end wall for spacing the distributor upwardly from the bottom of said tank.

5. In a water treatment tank having a closed bottom, a bed of particulate water treatment material in said tank, water conduit means in said tank extending through said bed, and an improved bottom distributor coupled to said conduit means beneath said bed adjacent said bottom comprising, a unitary body member of molded synthetic plastic material having a tubular hub portion, an annular flange projecting substantially radially outwardly from said hub portion, a generally tubular wall depending from the outer periphery of said flange having a multiplicity of attenuated slots, an annular imperforate skirt portion around the lower margin of said tubular wall, an end wall secured to the inner periphery of said skirt portion in downwardly spaced relation to said flange, said end wall being formed with a multiplicity of arcuate concentric attenuated slots for the passage of water to and from the interior of said distributor, said arcuate slots in said end wall being interrupted by a plurality of radially extending ribs, a plurality of brace rods projecting upwardly from said radially extending ribs into contact with said annular flange in radially inwardly spaced relation to said tubular wall, and a plurality of circumferentially spaced feet projecting downwardly from said end wall for spacing said distributor upwardly a predetermined distance from said bottom.

6. A unitary intermediate product in the manufacture of a bottom distributor for a liquid treatment tank consisting of a substantially circular disc-like synthetic plastic member securable to said bottom distributor as an end wall of said bottom distributor, there being a multiplicity of arcuate, concentric, attenuated slots in said member, a plurality of radially extending ribs interrupting said slots, a plurality of brace rods integral with one side of said member and extending upwardly from said ribs radially inwardly of the circumferential edge of said member, and a plurality of circumferentially spaced feet integral with and projecting downwardly from the other side of said member for spacing said member a predetermined distance from the bottom of a tank.

References Cited in the file of this patent
UNITED STATES PATENTS

| | | |
|---|---|---|
| 815,290 | Greer | Mar. 13, 1906 |
| 2,257,944 | Fischbein | Oct. 7, 1941 |
| 2,742,421 | McGill | Apr. 17, 1956 |
| 2,747,742 | Royer et al. | May 29, 1956 |